United States Patent
Parkinson et al.

(10) Patent No.: US 7,734,658 B2
(45) Date of Patent: Jun. 8, 2010

(54) PRIORITY QUEUE TO DETERMINE ORDER OF SERVICE FOR LDAP REQUESTS

(75) Inventors: Steven W. Parkinson, San Jose, CA (US); Nathan G. Kinder, Castro Valley, CA (US)

(73) Assignee: Red Hat, Inc., Raleigh, NC (US)

( * ) Notice: Subject to any disclaimer, the term of this patent is extended or adjusted under 35 U.S.C. 154(b) by 146 days.

(21) Appl. No.: 11/514,823

(22) Filed: Aug. 31, 2006

(65) Prior Publication Data

US 2008/0071811 A1 Mar. 20, 2008

(51) Int. Cl.
*G06F 7/00* (2006.01)
*G06F 15/16* (2006.01)

(52) U.S. Cl. ...................... 707/802; 709/203
(58) Field of Classification Search ................ 707/101; 709/203
See application file for complete search history.

(56) References Cited

U.S. PATENT DOCUMENTS

| | | | |
|---|---|---|---|
| 5,860,003 A | 1/1999 | Eidler et al. | |
| 6,073,175 A * | 6/2000 | Tavs et al. | 709/226 |
| 6,463,470 B1 * | 10/2002 | Mohaban et al. | 709/223 |
| 6,466,984 B1 * | 10/2002 | Naveh et al. | 709/228 |
| 6,553,368 B2 * | 4/2003 | Martin et al. | 707/3 |
| 6,609,121 B1 * | 8/2003 | Ambrosini et al. | 707/3 |
| 6,622,170 B1 * | 9/2003 | Harrison et al. | 709/221 |
| 6,633,872 B2 * | 10/2003 | Ambrosini et al. | 707/9 |
| 6,654,891 B1 * | 11/2003 | Borsato et al. | 726/6 |
| 6,665,674 B1 * | 12/2003 | Buchanan et al. | 707/10 |
| 6,732,160 B2 * | 5/2004 | Ambrosini et al. | 709/218 |
| 6,785,686 B2 * | 8/2004 | Boreham et al. | 707/102 |
| 6,850,928 B1 * | 2/2005 | McClure et al. | 707/3 |
| 7,020,662 B2 | 3/2006 | Boreham et al. | |
| 7,039,914 B2 | 5/2006 | Potter, Jr. | |
| 7,058,717 B2 | 6/2006 | Chao et al. | |
| 7,548,989 B2 * | 6/2009 | Alexander et al. | 709/232 |
| 2001/0027445 A1 * | 10/2001 | Eichelsdoerfer et al. | 705/65 |
| 2002/0032775 A1 * | 3/2002 | Venkataramaiah et al. | 709/225 |
| 2002/0087718 A1 * | 7/2002 | Hill et al. | 709/237 |
| 2003/0110246 A1 * | 6/2003 | Byrne et al. | 709/223 |
| 2003/0182464 A1 * | 9/2003 | Hamilton et al. | 709/314 |
| 2003/0195962 A1 * | 10/2003 | Kikuchi et al. | 709/226 |

(Continued)

FOREIGN PATENT DOCUMENTS

EP  1-310-856 A2 *  5/2003

OTHER PUBLICATIONS

Howes, Timothy A., et al., Understanding and Deploying LDAP Directory Services, MacMillan Technical Publishing, ISBN 1-57870-070-1, © 1999, pp. 344-362.*

(Continued)

*Primary Examiner*—Robert Stevens
(74) *Attorney, Agent, or Firm*—Blakely, Sokoloff, Taylor & Zafman LLP

(57) ABSTRACT

Techniques for improving the performance of a Lightweight Directory Access Protocol ("LDAP") server are described. The server computes the priority of an LDAP request and enqueues it on a priority queue according to the priority. A high-priority LDAP request is removed from the queue to prepare a corresponding LDAP response. Systems and software to implement similar techniques are also described and claimed.

17 Claims, 4 Drawing Sheets

U.S. PATENT DOCUMENTS

| | | | |
|---|---|---|---|
| 2004/0054808 A1* | 3/2004 | Ekberg | 709/245 |
| 2004/0117350 A1* | 6/2004 | Cavage et al. | 707/2 |
| 2005/0015673 A1 | 1/2005 | Plesko et al. | |
| 2005/0015763 A1* | 1/2005 | Alexander et al. | 718/100 |
| 2005/0021661 A1* | 1/2005 | Duloutre et al. | 709/217 |
| 2006/0006222 A1* | 1/2006 | Brey et al. | 235/379 |
| 2006/0031185 A1* | 2/2006 | Jose et al. | 707/1 |
| 2007/0050331 A1* | 3/2007 | Bauman et al. | 707/3 |

OTHER PUBLICATIONS

Thompson, Dan, "Understanding LDAP", Microsoft Corp. White Paper, Redmond, WA, © 2000, pp. i-iv and 1-109.*

Fink, Josef, et al., "User Modeling for Personalized City Tours", Artificial Intelligence Review, vol. 18, No. 1, Sep. 2002, pp. 33-74.*

Bin, Zeng, et al., "A Model of Scalable Distributed Network Performance Management", ISPAN '04, May 10-12, 2004, pp. 607-612.*

Guo, Hong, et al., "Research and Design on Distributed Information Integrated Model Based on LDAP and Intelligent Agent", Proc. of the 8th International Conf. on Computer Supported Cooperative Work in Design, Vol., May 26-28, 2004, pp. 319-323.*

Mehra, Ashish, et al., "Policy-Based Diffserv on Internet Servers: The AIX Approach", IEEE Internet Computing, vol. 4, Issue 5, Sep./Oct. 2000, pp. 75-80.*

Microsoft Computer Dictionary, 5th Edition, Microsoft Press, Redmond, WA, © 2002, p. 433.*

* cited by examiner

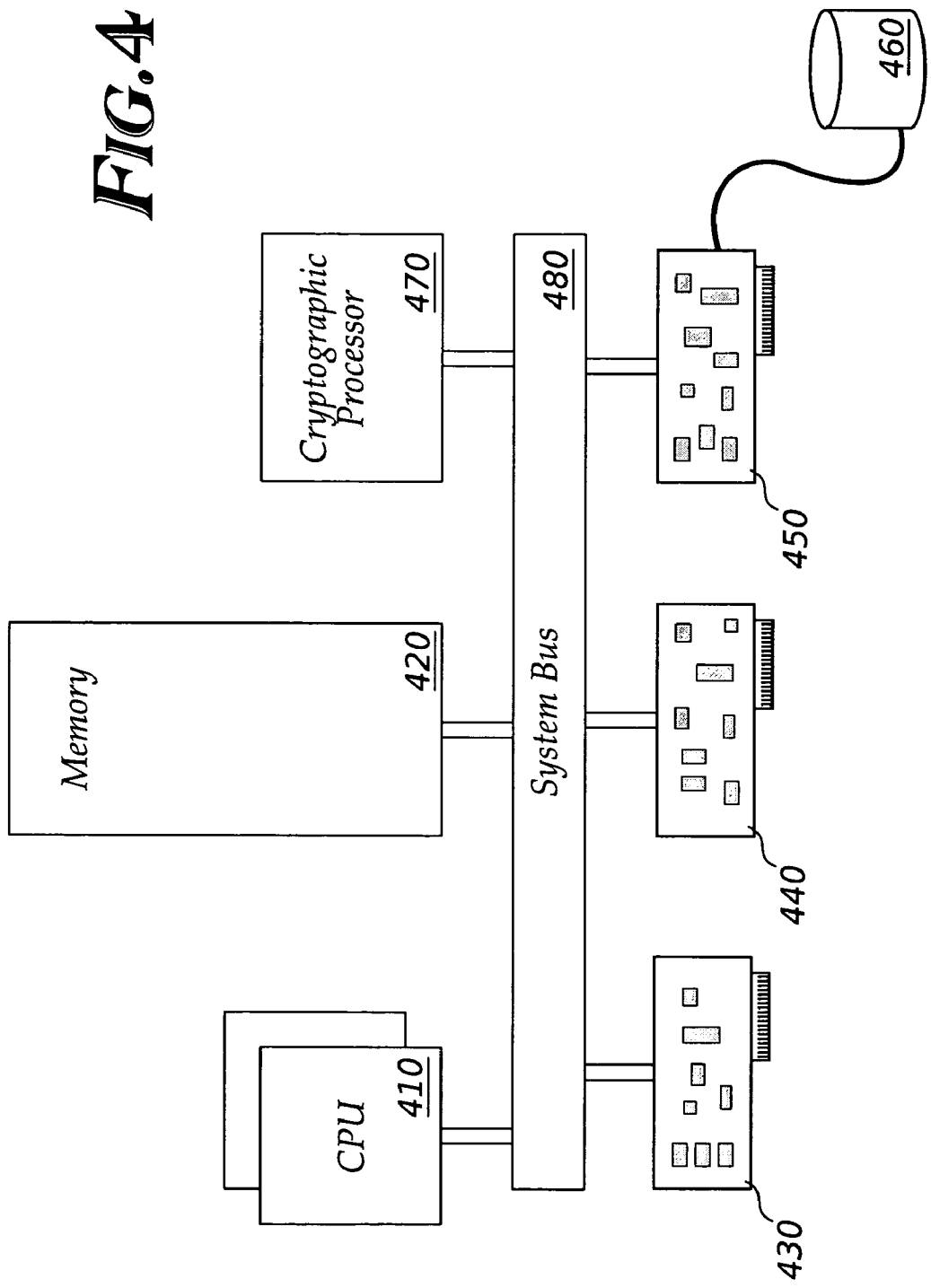

PRIORITY QUEUE TO DETERMINE ORDER OF SERVICE FOR LDAP REQUESTS

FIELD

The invention relates to improving performance of database query operations. More specifically, the invention relates to prioritizing processing of Lightweight Directory Access Protocol ("LDAP") requests.

BACKGROUND

The Lightweight Directory Access Protocol ("LDAP") is a standard computer networking protocol for querying and modifying entries in a database. The basic protocol is defined in a group of Internet Engineering Task Force ("IETF") Request for Comments ("RFC") documents; various aspects of the current version of the protocol (version 3) are described in RFCs listed in the "LDAP Technical Specification Road Map" (RFC4510, published June 2006). The databases reachable through LDAP may contain any sort of data, but most commonly contain identity and contact information for people and organizations.

LDAP may be viewed as a communication framework within which a client and server establish and conduct a conversation. The client issues one or more requests, and the server responds with a similar number of replies. The client generally need not wait for a response to one request before sending another request, and the server is generally not required to respond to multiple outstanding requests in the same order they were issued. Many LDAP requests can be answered very quickly, but some requests can cause the server to dedicate large amounts of memory or many computing cycles to prepare a response.

Since LDAP servers are often deployed in applications where they must respond to queries from an enormous number of clients (many of which may only issue one or two simple requests), it is important that the server's design address the issue of computationally expensive queries, to attempt to mitigate the effect of such queries on the quality of service enjoyed by less demanding clients.

BRIEF DESCRIPTION OF DRAWINGS

Embodiments of the invention are illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

FIG. 4 is a block diagram of a system that implements an embodiment of the invention.

DETAILED DESCRIPTION

Figure 1:
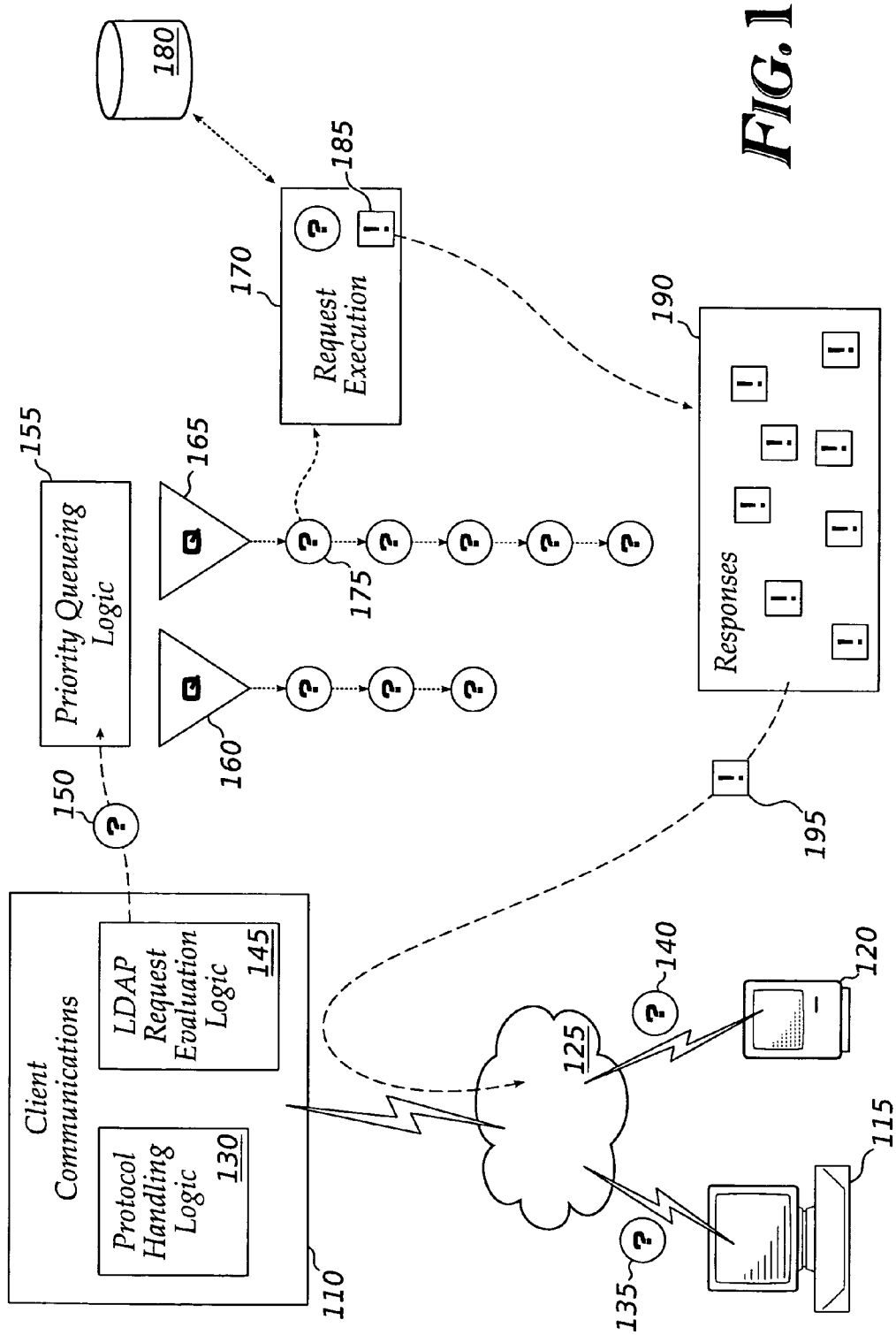
FIG. 1 shows an overview of logical blocks of an LDAP server according to an embodiment, and some interactions between the LDAP server and its clients.

FIG. 1 shows logical subsystems of an LDAP server that implements an embodiment of the invention. A client communication module 110 accepts connections from, and communicates with, LDAP clients 115 and 120 over a distributed data network 125 such as the Internet. Client communication module 110 includes protocol handling logic 130 so that it can carry on conversations according to the LDAP protocol. Clients issue LDAP requests 135, 140, which are received by the LDAP server. LDAP request evaluation logic 145 within the client communication module 110 evaluates a request 150, assigns it a priority, and passes it to priority queueing logic 155 to be enqueued on one of the priority queues 160, 165. Priority queueing logic 155 maintains one or more queues of LDAP requests so that the highest priority request on each queue can be removed for subsequent execution.

Request execution logic 170 retrieves a prioritized request 175 from a priority queue 165 and executes the request by interacting with database 180. Request execution logic 170 may read and write data directly from/to a mass storage device, or may use database interface logic (not shown) to issue commands to and interpret results from an external database. An appropriate LDAP response 185 is prepared and returned to response pool 190. Eventually, an LDAP response 195 is removed from response pool 190 by client communication module 110 and returned to the corresponding client, as indicated by the dashed arrow.

Figure 2:
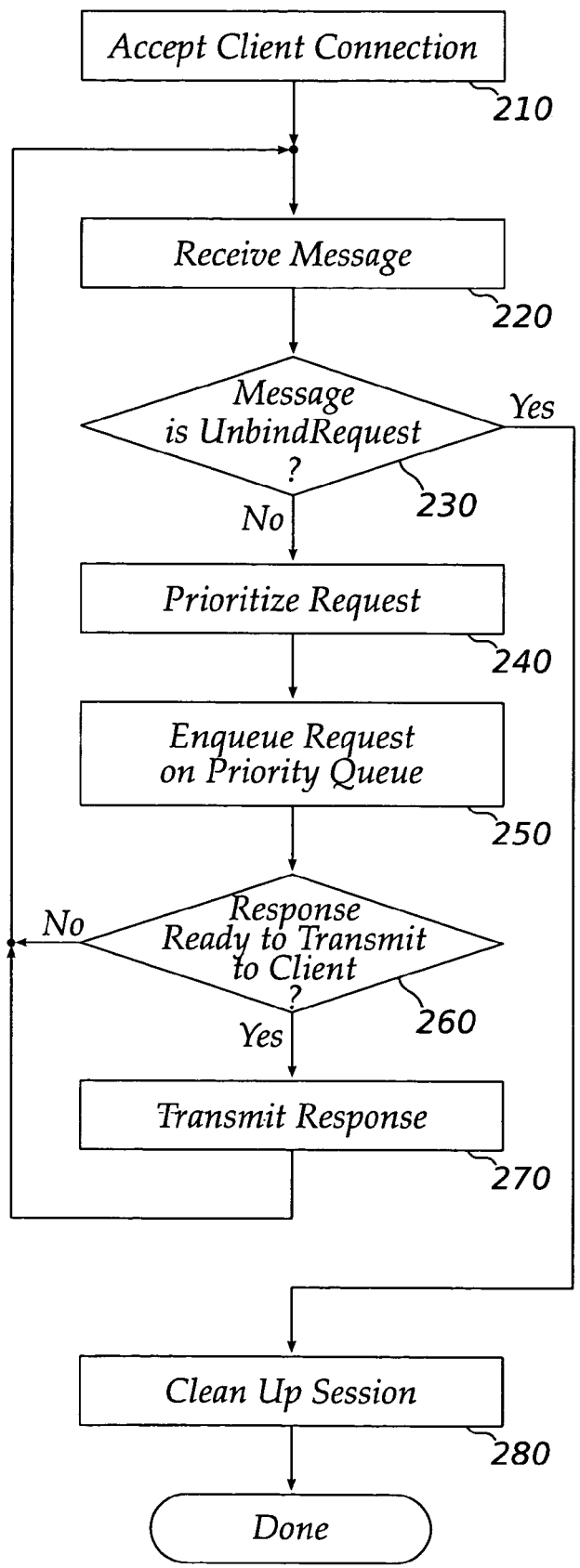
FIG. 2 is a flow chart of the client-interaction portion of an embodiment.

FIG. 2 is a flow chart illustrating a flow of the client communication module shown as element 110 in FIG. 1. At 210, a connection from a client is accepted. The connection may be made over any stream-oriented lower-level data communication protocol, such the Transmission Control Protocol ("TCP") or the encrypted Secure Socket Layer ("SSL") protocol.

Since an LDAP client may send multiple requests during a session, subsequent client interaction operations occur in a loop. At 220, a message from the client is received. If the message is an LDAP "UnbindRequest" message (230), the client is indicating that it wishes to terminate the session. The client communication module (and possibly other portions of the LDAP server) clean up the session (280) by releasing data structures and other resources used to serve the client, discarding any unsent responses for the client, logging performance data, closing the network connection and so on. A client can also simply disconnect (perhaps due to network trouble); this can be treated similarly to an "UnbindRequest" message.

If the message is not an "UnbindRequest" message, LDAP request evaluation logic prioritizes the request (240) according to criteria described below. The prioritized request is enqueued on a priority queue (250). At 260, the client communication module checks to see whether there is a response ready to transmit to the client and, if there is, the response is transmitted (270). Finally, the client service loop repeats.

The client communication module's message-receiving functions and response-transmitting functions need not be performed in precisely the order shown in this flow chart. Those of skill in the art will recognize that if operation 220 blocks (i.e. if program or thread operation pauses until a message is received) then any responses generated may not be transmitted timely. Therefore, a practical implementation may separate the receiving and transmitting functions and execute them in parallel, use non-blocking input/output ("I/O") functions, or adopt some similar strategy to facilitate efficient and timely bidirectional client communications.

Figure 3:
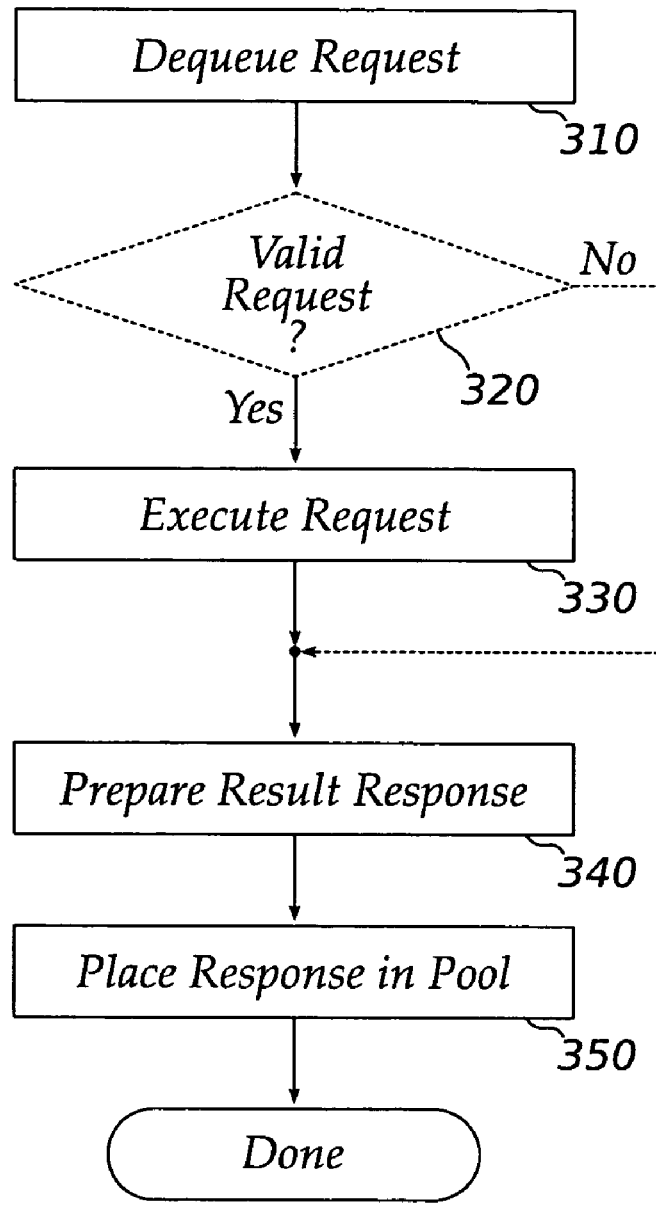
FIG. 3 is a flow chart of the request processing portion of an embodiment.

FIG. 3 is a flow chart illustrating a flow of the request execution portion of the LDAP server. This portion services LDAP clients' requests that have been enqueued onto priority queues by the client communications logic. At block 310, one of the requests is removed from its priority queue. As is well-known in the art, a priority queue operates so that the highest priority requests (according to the prioritization criteria of the request evaluation logic) advance to the front of the queue. Therefore, the request execution logic will process requests in order of importance, rather than in order of arrival.

The request may optionally be checked for validity (320, shown in phantom) before execution. For example, a request to alter database contents may be checked to ensure that appropriate client validation has occurred, and a request from a client that disconnected before the request was dequeued for execution may be discarded. In some embodiments, validity checks can be performed by the client communications logic, relieving the execution logic of this task.

If the request is valid, it is executed by, for example, searching the database to find matching records or updating a record in the database to contain new information (330). The LDAP server may manage the database itself, reading and writing directly from mass storage devices; or it may prepare and execute database operations using a different database access mechanism such as a Structured Query Language ("SQL") query.

At block 340, a response is prepared. The response may contain records found by a search, a "success" or "failure" indicator of a database modification, or some other message to apprise the client of the outcome of its request. The response is placed in a response pool for eventual transmission back to the requesting client (350). Although FIG. 3 shows the process ending here, a practical LDAP server could repeat these operations in a loop to serve more requests dequeued from the priority queue.

Note that passing requests from the client communications logic to the request execution logic via the priority queue(s) as shown and described in relation to FIGS. 1-3 permits the communication tasks to be decoupled from the request execution logic. This is in contrast to simple, prior art network servers, where a single thread of execution dedicated to each client performs all the work in sequence: receiving a request, executing the request, and returning any response, before beginning to work on the client's next request. Decoupling communication from execution via a priority queue lets the LDAP server developer exercise more control over the server's allocation of resources by deferring some lower-priority work in favor of high-priority requests.

Separation of LDAP server functions along the lines described and depicted above (i.e. client communication functions and request execution functions) can facilitate efficient use of modern multiprocessing hardware and multi-threaded execution environments. A first group of threads can be launched to perform client communication tasks: accepting new client connections; encrypting and decrypting messages if Secure Sockets Layer ("SSL") communications are in use; receiving LDAP queries and "unpacking" the query elements from their serialized transmission form; validating that messages are in the correct form; assigning priorities and enqueueing the requests; and "packing," possibly encrypting, and transmitting responses. A second group of threads can be launched to perform database-related tasks such as locating records that match a query, updating records with new information, and constructing responses containing requested information. The connection between these groups of threads is the priority queueing system for inbound requests, and the response pool for outbound replies. Requests from clients are prioritized and enqueued by the client communication threads, and dequeued and executed by the request execution threads. In some embodiments, the communication threads and the execution threads may execute on separate programmable processors in a system, on separate virtual machine environments hosted by a system, or on completely separate systems. In some of these situations, the priority queue(s) and response pool may be implemented as distributed data structures.

LDAP request evaluation logic shown as element 145 of FIG. 1 can use a variety of prioritization criteria selected to achieve desired performance goals. For example, requests from clients from a preselected range of network addresses can be given increased priority to improve LDAP query responsiveness for those clients. Clients that use (or do not use) SSL may be favored through the priority mechanism. In one embodiment, an LDAP client user can register for a service account, and the client can present authentication credentials for that account when requesting service. The priority assigned to LDAP requests in this embodiment can be determined by a service level associated with the service account.

The LDAP request evaluation logic can also examine requests individually and prioritize the requests based on an estimate of the computational expense of performing the request. For example, a database search query that involves multiple wildcards may be more expensive than one that simply requests a record identified by the record's Distinguished Name ("DN"). Inexpensive requests may receive higher priority than expensive requests. This can help ensure that expensive, long-running queries do not monopolize the server's database interaction capacity.

FIG. 4 shows a block diagram of a computer system that can support an embodiment of the invention. Programmable processors (identified as Central Processing Units or "CPUs") 410 execute instructions contained in a memory 420. The instructions cause the processors to perform operations as described above. Communication with LDAP clients occurs through network interfaces 430 and 440. Mass storage interface 450 permits the system to read and write data on mass storage device 460. This data may include the LDAP data from which client requests are satisfied. Some systems may include a hardware cryptographic processor 470 to accelerate encryption and decryption of SSL-protected client messages. The system components described and shown in FIG. 4 are connected to, and communicate over, system bus 480.

The particular methods of the invention have been described in terms of software with reference to a series of flowcharts. The methods to be performed by a computer or machine constitute programs made up of machine-executable instructions illustrated as blocks (acts). Describing the methods by reference to a flowchart enables one skilled in the art to develop such programs including such instructions to carry out the methods on suitably configured machines (the processing unit of the machine executing the instructions from machine-readable media). The machine-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g. program, procedure, process, application, module, logic), as taking an action or causing a result. Such expressions are merely a shorthand way of saying that execution of the software by a machine causes the processor of the machine to perform an action or to produce a result. It will be appreciated that more or fewer processes may be incorporated into the methods as described above without departing from the scope of the invention, and that no particular order is implied by the arrangement of blocks shown and described herein.

An embodiment of the invention may be a machine-readable medium having stored thereon instructions to cause a programmable processor to perform operations as described above. The instructions may be directly executable by a programmable processor, or they may be in a "source code" form that can be compiled into executable instructions to control a programmable processor. In other embodiments, the operations might be performed by specific hardware components that contain hardwired logic. Those operations might alternatively be performed by any combination of programmed computer components and custom hardware components.

A machine-readable storage medium may include any mechanism for storing information in a form readable by a machine (e.g., a computer), including but not limited to Compact Disc Read-Only Memory ("CD-ROM"), Read-Only Memory ("ROM"), Random Access Memory ("RAM"), and Erasable Programmable Read-Only Memory ("EPROM").

The applications of the present invention have been described largely by reference to specific examples and in terms of particular allocations of functionality to certain hardware and/or software components. However, those of skill in the art will recognize that Lightweight Directory Access Protocol ("LDAP") service can also be provided efficiently by software and hardware that distribute the functions of embodiments of this invention differently than herein described. Such variations and implementations are understood to be captured according to the following claims.

The invention claimed is:

1. A computerized method for a Lightweight Directory Access Protocol ("LDAP") server, the method comprising:
   receiving, by the LDAP server, a plurality of LDAP requests from a plurality of LDAP clients, the plurality of LDAP requests comprising an LDAP directory query request and an LDAP directory modification request;
   computing, by the LDAP server, a priority of each of the LDAP requests of the plurality of LDAP clients, the LDAP requests pertaining to data in an LDAP database, the priority being based at least in part on the LDAP client;
   enqueueing, by the LDAP server, each of the LDAP requests on a priority queue according to the priority;
   dequeueing, by the LDAP server, the highest priority LDAP request from the priority queue;
   preparing, by the LDAP server, a corresponding LDAP response for a corresponding LDAP client using the data in the LDAP database;
   storing, by the LDAP server, the corresponding LDAP response in a response pool; and
   sending, by the LDAP server, the corresponding LDAP response to the corresponding LDAP client.

2. The computerized method of claim 1 wherein the priority is based in part on a network address of an LDAP client that issued the LDAP request.

3. The computerized method of claim 1 wherein the priority is based in pad on authentication information associated with an LDAP client that issued the LDAP request.

4. The computerized method of claim 1 wherein the priority is based in part on whether the LDAP request was received over a Secure Sockets Layer ("SSL") connection.

5. The computerized method of claim 1, further comprising:
   estimating a computational complexity of the LDAP request, wherein
   the priority is based in part on the estimated computational complexity.

6. A Lightweight Directory Access Protocol ("LDAP") server system comprising:
   at least one data storage device to host an LDAP database;
   at least one processor, coupled to the data storage device, to communicate with a plurality of LDAP clients, to receive a plurality of LDAP requests from the plurality of LDAP clients, the plurality of LDAP requests comprising an LDAP directory query request and an LDAP directory modification request, to compute a priority of each of the plurality of LDAP requests pertaining to data in the LDAP database, the priority being based at least in part on the LDAP client, and to order the plurality of LDAP requests according to the priority of each of the LDAP requests; and
   a memory, coupled to the processor, the memory having at least one priority queue of the plurality of LDAP requests ordered according to the priority of each of the LDAP requests,
   wherein the processor is to dequeue the highest priority LDAP request from the priority queue, prepare a corresponding LDAP response for a corresponding LDAP client based on the data in the LDAP database, and store the corresponding LDAP response in a response pool.

7. The system of claim 6 wherein the LDAP request evaluation logic computes the priority based in part on a network address from which the LDAP request was received.

8. The system of claim 6 wherein the LDAP request evaluation logic computes the priority based in pad on authentication information associated with an LDAP client that transmitted the LDAP request.

9. The system of claim 6 wherein the LDAP request evaluation logic computes the priority based in part on whether the LDAP request was received over a Secure Sockets Layer ("SSL") connection.

10. The system of claim 6 wherein the LDAP request evaluation logic computes the priority based in part on an estimation of a computational complexity of the LDAP request.

11. A machine-readable storage medium containing executable instructions to cause a programmable processor to perform operations comprising:
    receiving, by the LDAP server, a plurality of LDAP requests from a plurality LDAP clients, the plurality of LDAP requests comprising an LDAP directory query request and an LDAP directory modification request;
    computing, by the LDAP server, a priority of each of the LDAP requests of the plurality of LDAP clients, the LDAP requests pertaining to data in an LDAP database, the priority being based at least in part on the LDAP client;
    enqueueing, by the LDAP server, each of the LDAP requests on a priority queue according to the priority;
    dequeueing, by the LDAP server, the highest priority LDAP request from the priority queue;
    preparing, by the LDAP server, a corresponding LDAP response for a corresponding LDAP client using the data in the LDAP database;
    storing, by the LDAP server, the corresponding LDAP response in a response pool; and
    sending, by the LDAP server, the corresponding LDAP response to the corresponding LDAP client.

12. The machine-readable storage medium of claim 11, containing additional executable instructions to cause the programmable processor to perform operations comprising:

launching a first group of threads to communicate with LDAP clients; and launching a second group of threads to execute requests on a database.

13. The machine-readable storage medium of claim 11 wherein the priority of the LDAP request is based in part on a network address from which the LDAP request was received.

14. The machine-readable storage medium of claim 11 wherein the priority of the LDAP request is based in part on authentication information associated with an LDAP client that issued the LDAP request.

15. The machine-readable storage medium of claim 11 wherein the priority of the LDAP request is based in part on whether the LDAP request was received over a Secure Sockets Layer ("SSL") connection.

16. The machine-readable storage medium of claim 11, containing additional executable instructions to cause the programmable processor to perform operations comprising:

estimating a computational cost of the LDAP request, wherein the priority of the LDAP request is based in part on the estimated computational cost.

17. A system comprising:

a memory having at least one priority queue; and at least one processor, coupled to the memory, to enqueue a plurality of Lightweight Directory Access Protocol ("LDAP") requests of a plurality of LDAP clients on the priority queue, the plurality of LDAP requests comprising an LDAP directory query request and an LDAP directory modification request, each of the plurality of LDAP requests pertaining to data in an LDAP database, and to process the highest priority LDAP request from the priority queue to produce a corresponding LDAP response for a corresponding LDAP client based on the data in the LDAP database; wherein a priority of the LDAP request is based on one of an address from which the LDAP request was received, authentication information received with the LDAP request, or an estimate of a computational complexity of the LDAP request.

* * * * *